United States Patent
Brandt

(10) Patent No.: US 12,044,320 B2
(45) Date of Patent: Jul. 23, 2024

(54) SWITCHING ASSEMBLY FOR PRESSURE RELIEF VALVES

(71) Applicant: California Controlled Atmosphere, Dinuba, CA (US)

(72) Inventor: Gordon Brandt, Kingsburg, CA (US)

( * ) Notice: Subject to any disclaimer, the term of this patent is extended or adjusted under 35 U.S.C. 154(b) by 323 days.

(21) Appl. No.: 17/827,924

(22) Filed: May 30, 2022

(65) Prior Publication Data

US 2022/0290766 A1 Sep. 15, 2022

Related U.S. Application Data

(63) Continuation-in-part of application No. 16/290,907, filed on Mar. 3, 2019, now Pat. No. 11,346,453.

(51) Int. Cl.
| F16K 11/16 | (2006.01) |
| F16K 31/53 | (2006.01) |
| F16K 31/60 | (2006.01) |

(52) U.S. Cl.
CPC .......... F16K 11/166 (2013.01); F16K 31/535 (2013.01); F16K 31/602 (2013.01)

(58) Field of Classification Search
CPC .... F16K 11/165; F16K 11/166; F16K 31/535; F16K 31/602
See application file for complete search history.

(56) References Cited

U.S. PATENT DOCUMENTS

| 3,116,755 | A | * | 1/1964 | Daniel | F16K 11/166 |
| | | | | | 137/599.14 |
| 3,411,537 | A | | 11/1968 | Gladstone et al. | |
| 3,595,270 | A | | 7/1971 | McNeal, Jr. | |
| 3,679,060 | A | * | 7/1972 | Smith | B01D 35/12 |
| | | | | | 210/333.1 |
| 4,080,990 | A | | 3/1978 | De Benedetti | |
| 4,921,598 | A | * | 5/1990 | Desch | C02F 1/42 |
| | | | | | 210/190 |
| 5,423,349 | A | | 6/1995 | Wicks et al. | |
| 5,443,722 | A | | 8/1995 | Desai et al. | |
| 5,727,595 | A | * | 3/1998 | Eminger | F16K 11/0876 |
| | | | | | 251/86 |

(Continued)

FOREIGN PATENT DOCUMENTS

GB 553603 A 5/1943

OTHER PUBLICATIONS

PBM Valve Solutions, Double Block & Bleed Valve (originally retrieved Oct. 1, 2018 from https://www.pbmvalve.com/valves/double-block-bleed-valve).

(Continued)

*Primary Examiner* — Reinaldo Sanchez-Medina
(74) *Attorney, Agent, or Firm* — Marcus N. DiBuduo; John R. Aaron

(57) ABSTRACT

A switching assembly for diverting fluid flow can include a pair of chambers each having a three-way valve positioned therein. An actuator, which can include a lever and one or more gears, may be coupled with each three-way valve to allow an operator to divert flow through each three-way valve by means of the actuator. The switching assembly can be coupled with one or more pressure relief valves, allowing an operator to safely replace a pressure relief cartridge by diverting flow away from the corresponding pressure relief valve without diverting flow upstream or temporarily shutting off a fluid line.

17 Claims, 10 Drawing Sheets

(56) References Cited

U.S. PATENT DOCUMENTS

| | | | | |
|---|---|---|---|---|
| 6,197,195 | B1 * | 3/2001 | Booth | B01D 35/12 |
| | | | | 137/630.17 |
| 6,415,819 | B1 * | 7/2002 | Pas | F16K 35/14 |
| | | | | 137/637.1 |
| 7,509,885 | B2 | 3/2009 | Gerlofs et al. | |
| 9,027,427 | B2 | 5/2015 | Economou | |
| 9,222,597 | B2 * | 12/2015 | Asokan | F16K 31/44 |
| 10,591,071 | B2 * | 3/2020 | Kruppe | F16K 17/048 |
| 11,346,453 | B2 * | 5/2022 | Brandt | F16K 11/165 |
| 2007/0039653 | A1 | 2/2007 | Maggard | |

OTHER PUBLICATIONS

Inspectapedia, Water Softener Bypass Valve Operation & Repair (originally retrieved Oct. 8, 2018 from https://inspectapedia.com/plumbing/Water_Softener_Bypass.php).

Bypass Valve Assembly (originally retrieved Oct. 8, 2018 from https://images-na.ssl-images-amazon.com/images/I/61X7ADDvjIL._SL1200_.jpg).

Bypass Assembly (originally retrieved Oct. 8, 2018 from https://www.watersoftener-parts.com/pages/DIAGRAMS/images-7000/7000-Bypass_assembly.jpg).

\* cited by examiner

SWITCHING ASSEMBLY FOR PRESSURE RELIEF VALVES

CROSS-REFERENCE TO RELATED APPLICATIONS

The present application is a continuation-in-part of U.S. Nonprovisional patent application Ser. No. 16/290,907, filed Mar. 3, 2019, which is hereby incorporated by reference in its entirety.

FIELD OF THE INVENTION

The present invention relates to a switching assembly and systems for diverting fluid flowing in a pressurized line. More particularly, embodiments of the present invention pertain to assemblies having valves which may be simultaneously mechanically actuated by means of a lever and gears. Embodiments of the present invention also pertain to systems by which fluid flow can be diverted in order to allow for quick, safe, and easy removal and replacement of valves.

BACKGROUND OF THE INVENTION

Heating, ventilation, and air conditioning ("HVAC") industries, such commercial refrigeration, typically employ a variety of safety and regulatory devices and mechanisms to ensure proper functioning, care, and maintenance of their systems. These systems may include valves which are employed to control, regulate, and divert flow through pipes and lines which may carry fluids such as water, natural gas, or refrigerant. However, when systems malfunction, break, corrode, or otherwise need replacing, it can often cause issues or pose significant risk the integrity of the system.

Anhydrous ammonia is used in a great number of industrial refrigerant systems that is a clear and colorless and exists in liquid or gas form. Though highly efficient in refrigerant systems, exposure to even a small concentration of ammonia in the air can cause significant human injury (including death). Ammonia, especially in the presence of moisture, can react with and corrode copper, zinc, and many alloys. Particularly with industrial refrigeration systems, precautionary measures are set in place in order to avoid refrigerant leaks, internal damage, or even explosions.

Some precautionary measures may involve the use of pressure relief valves, which are coupled with the refrigerant line to allow fluid to escape through a separate relief line when a certain level of pressure is exceeded (known as a "pressure event"), thus avoiding potential damage to the system. When the pressure in the line exceeds the threshold pressure of the pressure relief valve, the pressure relief valve opens and allows a portion of the refrigerant to escape through the relief line, where it is typically exhausted to the environment or recaptured. However, like many mechanical safety devices, they must be routinely checked, repaired, or replaced. When it comes time to remove a pressure relief valve, flow to the pressure relief valve must be shut off or diverted upstream, or the system as a whole must be shut down. If fluid flow is diverted to a line without another pressure relief valve, the system is susceptible to potential damage and/or hazardous leaks should a pressure event occur. At the same time, it may not be feasible to shut the system down completely in order to eliminate.

To overcome some of these challenges, some industrial refrigerant systems include a main and a backup pressure relief valve. However because the exhaust end of both the main and backup pressure relief valves are commonly tied to the same relief line, it can be appreciated that if either the main or the backup pressure relief valve is removed, and a pressure event occurs, it is possible for the refrigerant released by one of the pressure relief valves to travel through the piping and escape at the location where the pressure relief valve was located. It is, therefore, desirable for a system to have a device by which pressure relief valve may be replaced, without interruption to a system or pressurized line, and without risk of consequences due to a pressure event.

BRIEF SUMMARY OF THE INVENTION

The present invention concerns a switching assembly which can divert fluid flow through two or more three-way valves by means of an actuator. In some embodiments, a switching assembly may include a housing having an inlet and an outlet. In some implementations, a pressurized line of fluid may be connected at an inlet and a relief line may be connected to an outlet. The switching assembly housing may also have two or more chambers, each of which may house a three-way valve. In preferred embodiments, each chamber of a switching assembly may house ball-type three-way valves.

In some embodiments, the present invention may include a plurality of gears which may be coupled with a three-way valve. For example, and without limitation, a switching assembly may include a pair of gears, each coupled with a corresponding three-way valve. In certain embodiments, each gear may also be coupled, or meshed with the other adjacent gear, such that when one gear rotates, the adjacent gear also rotates. In a significant aspect of the present invention, the three-way valves corresponding to each gear simultaneously rotate when one of the gears is turned—thus the valves open and/or close at the same time. In some implementations, the gears may be directly meshed, for example and without limitation, by the teeth of the gears being interlocked with each other. In some other implementations, the gears may be meshed with one or more intermediary gears. It is to be appreciated that, in some preferred embodiments, the pair of gears may be configured to rotate in opposite directions with each other. For example, and without limitation, when a first gear rotates in a clockwise direction, a second gear rotates in a counter-clockwise direction. However, it is to be appreciated that in some other embodiments of the present invention, the gears may be configured to rotate in the same direction.

To turn a gear or three-way valve, in some embodiments, a lever may be provided. A lever may be coupled directly with a gear, or with a stem of a three-way valve, to allow a user to mechanically change the position of each three-way valve. It is to be appreciated that the term "lever" may include a variety of means to mechanically rotate a gear or valve, such as, but not limited to, a knob, wheel, single-bar handle, cross-arm handle, or the like. Alternatively, in certain embodiments, the switching assembly may include an electric actuator to rotate a gear or stem of a valve. An electric actuator may be activated by a button or switch (or the like) on the assembly, or by a device operatively engaged therewith, including but not limited to a system process controller. An electric actuator may also be automatically controlled or programmed to change the position of a three-way valve at a given time.

In some embodiments of the present invention, a switching assembly may be used in a pressurized system with a pressure relief valve. For example, and without limitation, a pressure relief valve (which, in some implementations and without limitation, may contain a housing and a pressure relief valve cartridge) can be coupled with a switching assembly. In a first configuration, fluid flow may enter through an inlet of the switching assembly and then be diverted to the pressure relief valve. To divert the fluid flow away from the pressure relief valve (e.g., to replace a pressure relief valve cartridge), the user can actuate the switching assembly to simultaneously rotate each of the three-way valves within the switching assembly housing, causing flow to divert away from the pressure relief valve.

In a preferred embodiment, a switching assembly may be coupled with a pair of pressure relief valves. In one configuration, a pressurized line may be connected to the switching assembly at an inlet thereof and the direction of fluid flow may be through the switching assembly to a first pressure relief valve containing a pressure relief valve cartridge. If the pressure relief valve cartridge needs to be replaced (e.g., if it is tripped during a pressure event), a user can actuate the switching assembly to divert the flow from the first pressure relief valve to a second pressure relief valve.

In some aspects of the present invention, a switching assembly may include: an assembly housing comprising an inlet, an outlet, a first chamber, and a second chamber; a first three-way valve comprising a first stem and a first valve member positioned within the first chamber of the assembly housing; a second three-way valve comprising a second stem and a second valve member positioned within the second chamber of the assembly housing; and an actuator coupled with the first stem and the second stem. In certain embodiments, the actuator may comprise a first gear engaged with the first stem, and a second gear engaged with the second stem.

The first gear may be directly or indirectly mechanically meshed with the second gear. In some embodiments, the actuator may be adapted to rotate the first three-way valve and the second three-way valve in opposite directions. In some embodiments, the actuator may also comprise a lever engaged with the first stem. The first stem and second stem may be substantially parallel In some embodiments, a first three-way valve may comprise a first ball valve and a first valve member may comprise a first ball, and a second three way valve may comprise a second ball valve and a second valve member may comprise a second ball.

In some aspects of the present invention, a system for diverting a fluid flowing in a pressurized line to a relief line may comprise: a switching assembly having a housing; a first pressure relief valve having a housing engaged with the switching assembly housing; and a second pressure relief valve having a housing engaged with the switching assembly housing. The switching assembly may have a housing with an inlet coupled with the pressurized line, an outlet coupled with the relief line, a first set of ports, and a second set of ports, a first three-way valve, a second three-way valve, and an actuator engaged with the first three-way valve and the second three-way valve. The first pressure relief housing may have a set of ports, wherein the set of ports of the first pressure relief valve housing may be aligned with the first set of ports of the switching assembly housing. The second pressure relief valve housing may have a set of ports, wherein the set of ports of the second pressure relief valve housing may be aligned with the second set of ports of the switching assembly housing.

In some embodiments, the actuator may have a first position, wherein in the first position, a first fluid path may be defined from the switching assembly housing inlet to the switching assembly housing outlet, through a first port of the first set of ports of the switching assembly housing, through a first port of the set of ports of the first pressure relief valve housing, through a second port of the set of ports of the first pressure relief valve housing, and through a second port of the first set of ports of the switching assembly housing.

In some embodiments, the actuator may have a second position, wherein in the second position, a second fluid path may be defined from the switching assembly housing inlet to the switching assembly housing outlet, through a first port of the second set of ports of the switching assembly housing, through a first port of the set of ports of the second pressure relief valve housing, through a second port of the set of ports of the second pressure relief valve housing, and through a second port of the second set of ports of the switching assembly housing.

In some embodiments of the present invention, a first three-way valve may have a first stem and a second three-way valve may comprise a second stem. In certain embodiments, the first three-way valve may have a first ball valve having a first ball, and the second three-way valve may have a second ball valve having a second ball. The first ball may be positioned within a first chamber of the switching assembly housing, and the second ball may be positioned within a second chamber of the switching assembly housing. In some embodiments, the first stem and the second stem may be substantially parallel.

In some embodiments, an actuator may have a first gear engaged with the first stem and a second gear, meshed with the first gear, and engaged with the second stem. In certain embodiments, the actuator further may include a lever engaged with the first stem.

In some embodiments of the present invention, a first pressure relief valve may have a first pressure relief cartridge positioned in a first pressure relief valve housing. A plurality of adapters may be provided for securing the first pressure relief valve housing and a second pressure relief valve housing to the switching assembly housing.

In accordance with some embodiments of the present invention, a method for replacing a pressure relief valve cartridge may include the steps of: inserting a first pressure relief cartridge into a first pressure relief valve housing; inserting a second pressure relief cartridge into a second pressure relief valve housing; and placing an actuator in a first position. The first and second pressure relief valve housings may be engaged with a housing of a switching assembly. The actuator may have a first gear engaged with a first stem of a first three-way valve and a second gear engaged with a second stem of a second three-way valve, where the first gear is meshed with the second gear, and where a portion of each of the first and second three-way valves are be positioned within the switching assembly housing.

In some embodiments, while the actuator is in the first position, the method may further include the steps of: first, removing the first pressure relief cartridge from the first pressure relief valve housing; then, inserting a third pressure relief cartridge into the first pressure relief valve housing; and then, placing the actuator in a second position. While the actuator is in the second position, the method may further include the steps of: first, removing the second pressure relief cartridge from the second pressure relief valve housing; then, inserting a fourth pressure relief cartridge into the second pressure relief valve housing; and then, placing the actuator in the first position.

According to some embodiments of the present invention, a switching assembly for diverting a fluid flowing into the switching assembly, may comprise: a) an assembly housing comprising an inlet, an outlet, a first chamber, and a second chamber; b) a first three-way valve comprising a first stem and a first valve member, wherein the first valve member is positioned within the first chamber of the assembly housing; c) a second three-way valve comprising a second stem and a second valve member, wherein the valve member is positioned within the second chamber of the assembly housing; and d) an actuator adapted to rotate the first three-way valve and the second three-way valve in opposite directions, the actuator comprising a first gear engaged with the first stem and a second gear engaged with the second stem; wherein the first gear is directly meshed with the second gear, wherein a central axis of each of the first stem and the second stem are perpendicular to a central axis extending from the inlet to the outlet, wherein an inlet fluid flow is defined through the inlet, wherein an outlet fluid flow is defined through the outlet, and wherein in all rotational positions of the actuator, the inlet fluid flow equals the outlet flow.

In some embodiments, the first three-way valve and the second three way valve of the switching assembly are each configured to divert the fluid from the inlet to the outlet according to one of the group consisting of a first fluid path, a second fluid path, and combinations thereof.

In some embodiments, neither of the first fluid path or the second fluid path of the switching assembly are in fluid communication with the atmosphere.

In some embodiments, the assembly housing of the switching assembly may further comprise a first set of ports and a second set of ports, wherein the first fluid path is through a first port and a second port of the first set of ports, and wherein the second fluid path is through a first port and a second port of the second set of ports.

In some embodiments, wherein in all rotational positions of the actuator of the switching assembly, along the first fluid path a volume of fluid through the first port of the first set of ports is equal to a volume of fluid through the outlet, and along the second fluid path a volume of fluid through the first port of the second set of ports is equal to a volume of fluid through the outlet.

According to some embodiments of the present invention, a system for diverting a fluid flowing in a pressurized line to a relief line may comprise: a) a switching assembly comprising: i) an assembly housing having an inlet coupled with the pressurized line, an outlet coupled with the relief line, a first set of ports, and a second set of ports, ii) a first three-way valve comprising a first stem, iii) a second three-way valve comprising a second stem, and iv) an actuator adapted to rotate the first three-way valve and the second three-way valve in opposite directions, the actuator comprising a first gear engaged with the first stem and a second gear engaged with the second stem, wherein the first gear is directly meshed with the second gear; wherein in all rotational positions of the actuator, a fluid flow through the inlet equals a fluid flow through the outlet, wherein an inlet fluid flow is defined through the inlet, wherein an outlet fluid flow is defined through the outlet; b) a first housing having a set of ports and engaged with the assembly housing, wherein the set of ports of the first housing are aligned with the first set of ports of the assembly housing; c) a first adapter engaged with each of a first port of the first set of ports of the assembly housing and a first port of the set of ports of the first housing; and d) a second adapter engaged with each of a second port of the first set of ports of the assembly housing and a second port of the set of ports of the first housing.

In some embodiments, the system for diverting a fluid flowing in a pressurized line to a relief line may further comprise: e) a second housing having a set of ports and engaged with the assembly housing, wherein the set of ports of the second housing are aligned with the second set of ports of the assembly housing.

In some embodiments, the system for diverting a fluid flowing in a pressurized line to a relief line may further comprise: f) a lock having a shackle; and g) a crossbar engaged with the assembly housing, wherein the crossbar comprises a first aperture at a first lateral end and a second aperture at a second lateral and wherein each aperture is adapted to receive the shackle of the lock; wherein the actuator of the switching assembly further comprises a lever having an aperture adapted to receive the shackle of the lock.

In some embodiments, the shackle of the lock of the system for diverting a fluid flowing in a pressurized line to a relief line is received through each of the aperture of the lever and the first aperture of the crossbar.

In some embodiments, the shackle of the lock of the system for diverting a fluid flowing in a pressurized line to a relief line is received through each of the aperture of the lever and the second aperture of the crossbar.

In some embodiments, a distal end of the lever of the actuator is substantially oriented in a direction toward the first housing and the fluid is flowing through the first housing.

In some embodiments, the distal end of the lever of the actuator is substantially oriented in a direction toward the second housing and the fluid is flowing through the second housing.

DETAILED DESCRIPTION OF THE INVENTION

Figure 1:
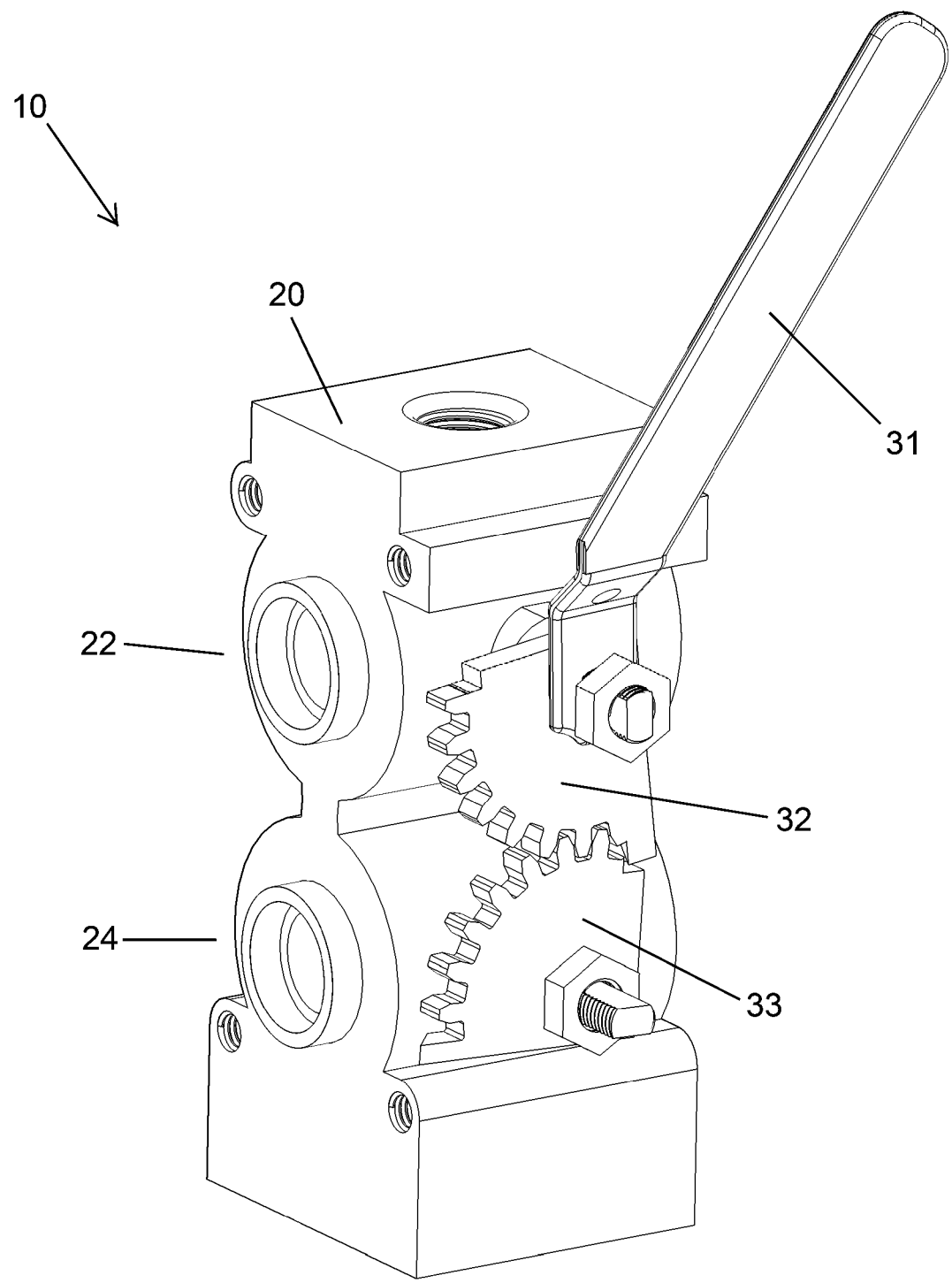
FIG. 1 is a perspective view illustrating an exemplary switching assembly in accordance with some embodiments of the present invention.

The invention, in its various aspects, will be explained in greater detail below. While the invention will be described in conjunction with several exemplary embodiments, the exemplary embodiments themselves do not limit the scope of the invention. Similarly, the exemplary illustrations in the accompanying drawings, where like elements have like numerals, do not limit the scope of the exemplary embodiments and/or invention, including any length, angles, or other measurements provided. Rather the invention, as defined by the claims, may cover alternatives, modifications, and/or equivalents of the exemplary embodiments.

In some embodiments of the present invention, a switching assembly may include a housing with one or more chambers therein. Referring to the exemplary illustration of FIG. 1, switching assembly 10 may comprise assembly housing 20 having a first chamber 22 and a second chamber 24 therein. The housing chambers may be adapted to receive therein one or more three-way valves. For example, switching assembly 10 may have a first three-way valve 42 (illustrated in FIG. 2) positioned within first chamber 22 and a second three-way valve 43 (illustrated in FIG. 2) positioned within second chamber 24.

Figure 2:
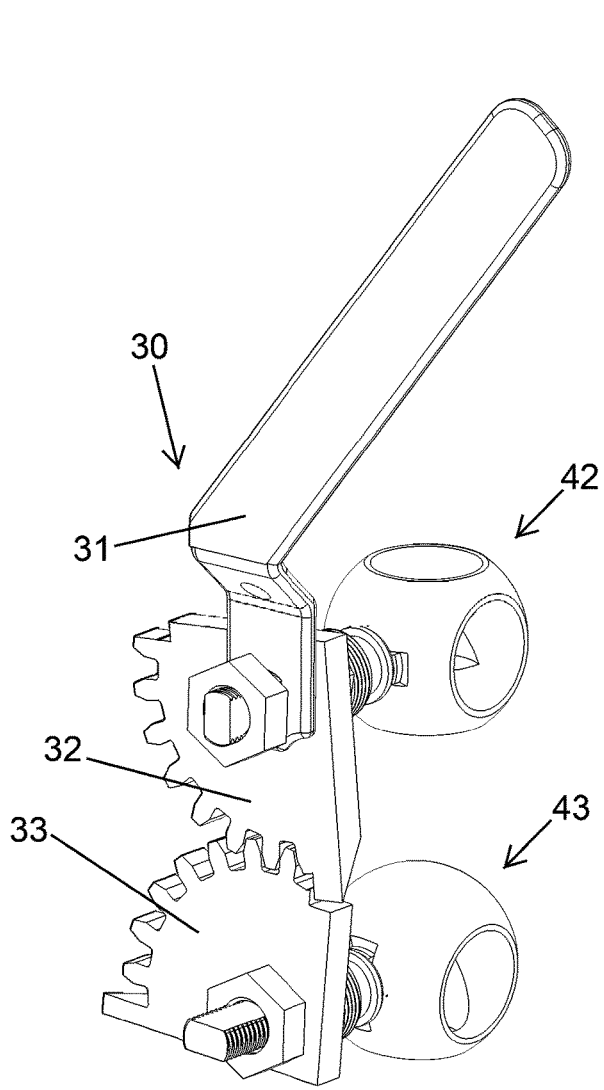
FIG. 2 is a perspective view illustrating an exemplary actuator coupled with an exemplary first three-way valve and an exemplary second three-way valve in accordance with some embodiments of the present invention.

As illustrated in FIG. 2, first three-way valve 42 and second three-way valve 43 may be coupled with an actuator 30 for simultaneously rotating each three-way valve. Actuator 30 of switching assembly 10 may comprise a lever 31, a first gear 32, and a second gear 33. It is to be appreciated that, in some alternative embodiments, an actuator may include other means by which to mechanically rotate a gear or valve, such as, but not limited to, a knob, a wheel, a handle, or the like. Furthermore, a switching assembly may include an electric actuator as a means for rotating a gear or valve. In certain embodiments, an electric actuator may be activated by a button or a switch on the assembly, or by a device operatively engaged therewith (e.g., via a wireless transceiver). In some embodiments, an electric actuator may be automatically controlled or programmed to be activated at a predefined time or under certain conditions (e.g., immediately following a pressure event).

Figure 3A:
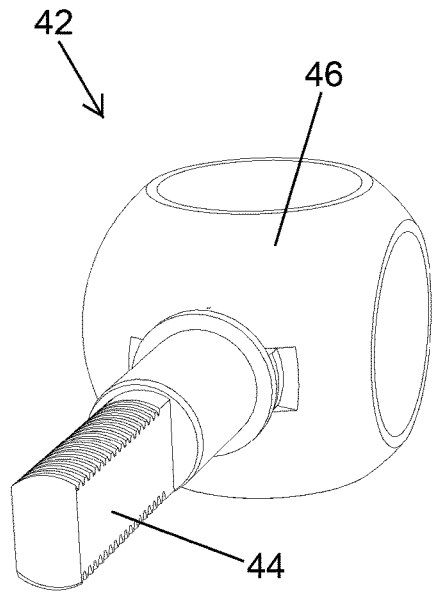
FIGS. 3A and 3B are perspective views of the three-way valves illustrated in FIG. 2, in accordance with some embodiments of the present invention.

Lever 31 and first gear 32 of actuator 30 may be coupled with first three-way valve 42 via engagement with a first stem 44 thereof (shown more clearly in FIG. 3A). Similarly, second gear 33 of actuator 30 may be coupled with second three-way valve 43 via engagement with a second stem 45 (shown more clearly in FIG. 3B). It is to be appreciated, however, that in some embodiments of the present invention, a lever may be coupled with a first or a second gear. First gear 32 may also be coupled, or meshed, with second gear 33, so that the rotation of one gear causes rotation of the other gear. By the coupling of the first and second gears 32 and 33, it is to be appreciated that in significant aspects of the invention, a user may simultaneously adjust first three-way valve 42 and second three-way valve 43 by turning lever 31, rotating first gear 32 or second gear 33, or by rotating first stem 44 or second stem 45.

Figure 3B:
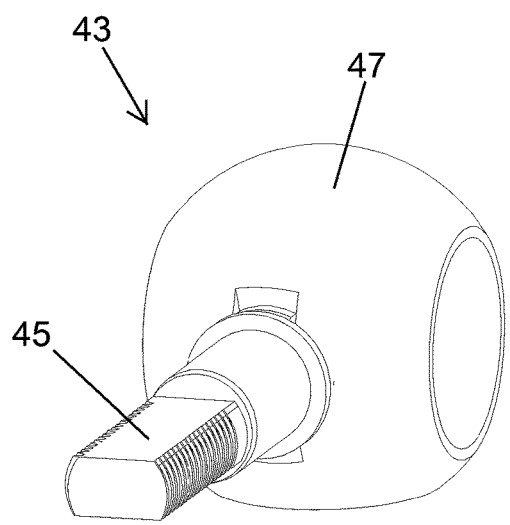

As more clearly shown in FIG. 3A, first stem 44 of first three-way valve 42 may be engaged with a first valve member 46. Similarly, second stem 45 of second three-way valve 43 may be engaged with a second valve member 47, as shown in FIG. 3B. In preferred embodiments, the valve member (or disc) of a three-way valve may include a ball (for example, and without limitation, when the three-way valve is of a "ball" type valve). In certain embodiments, each stem of each three-way valve may be oriented within the switching assembly such that the central axes thereof are perpendicular to the central (i.e., lengthwise from inlet to an outlet) axis of the switching assembly housing. Furthermore, first stem 44 and second stem 45 may also be oriented in switching assembly housing 20 such that each stem may be substantially parallel to the other.

It is to be appreciated that other embodiments and configurations are contemplated in accordance with the present invention. For example, and without limitation, the lever may be coupled with either the first three-way valve or the second three-way valve. The lever may also be engaged directly, or integrally formed, with the first stem, the second stem, the first gear, or the second gear. In certain embodiments, a lever may be coupled with a third gear which may be coupled, or meshed, with both the first gear and the second gear.

Figure 4:
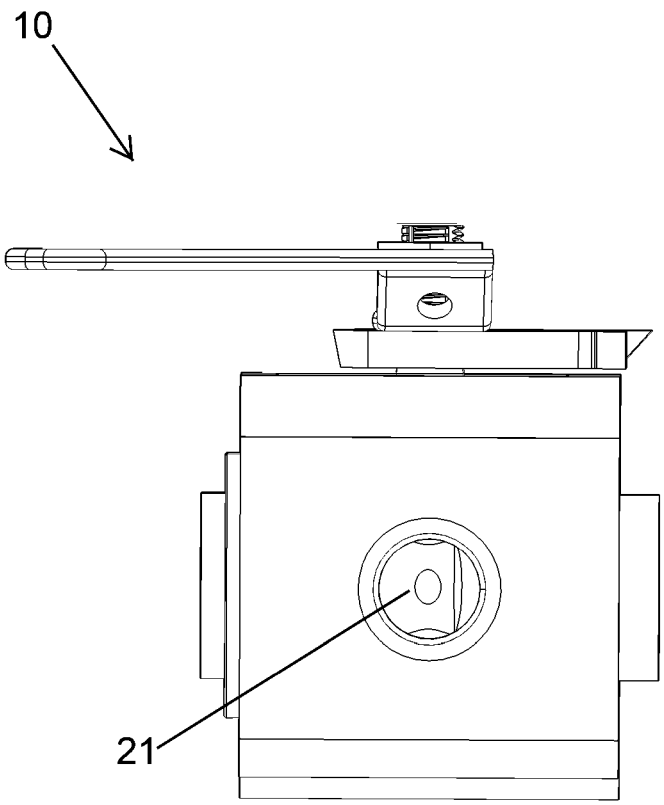
FIG. 4 is a top view of the switching assembly illustrated in FIG. 1, in accordance with some embodiments of the present invention.
Figure 5:
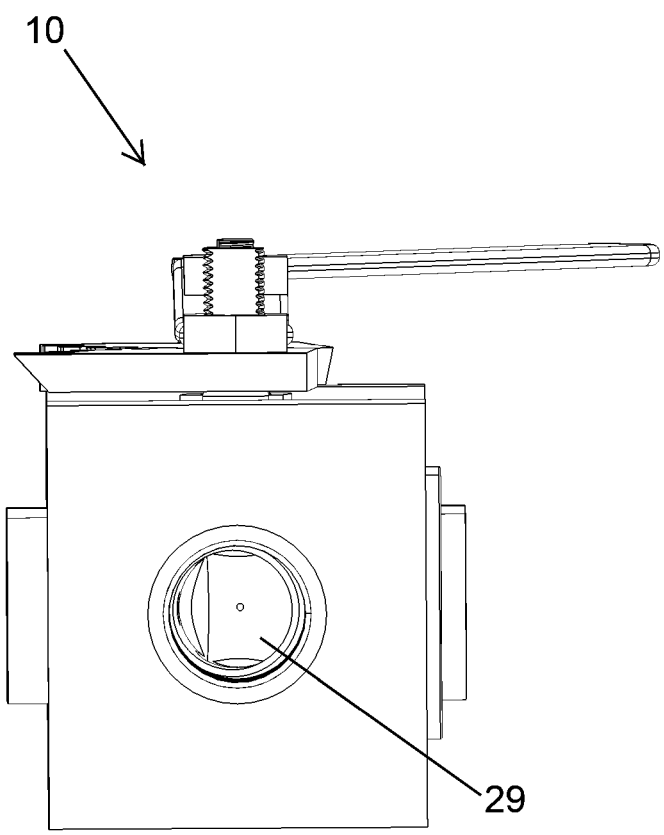
FIG. 5 is a bottom view of the switching assembly illustrated in FIG. 1, in accordance with some embodiments of the present invention.

As illustrated in FIGS. 4 and 5, switching assembly 10 may have a main inlet 21 and a main outlet 29 at the top and bottom, respectively, of assembly housing 20 (as oriented in FIG. 1). In preferred embodiments, a line of pressurized fluid may be coupled with a main inlet of a switching assembly and a relief line may be coupled with a main outlet of the switching assembly. For example, fluid may flow into switching assembly 10 via main inlet 21, and the fluid may flow out of switching assembly 10 via main outlet 29. It is to be appreciated, however, that the reference to "inlet" and "outlet" in the figures are relative terms, and does not limit the scope of the invention.

Figure 6:
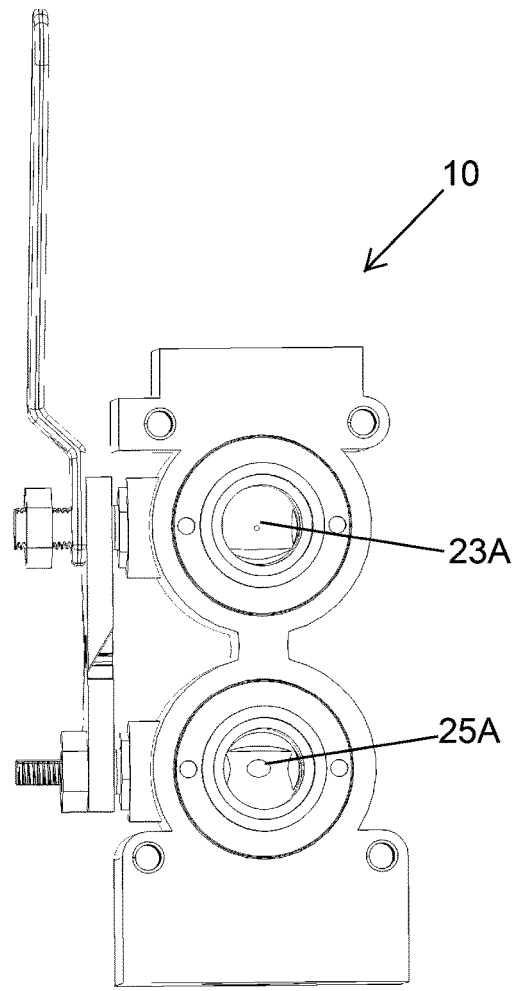
FIGS. 6 and 7 are opposite side views of the switching assembly illustrated in FIG. 1, in accordance with some embodiments of the present invention.
Figure 7:
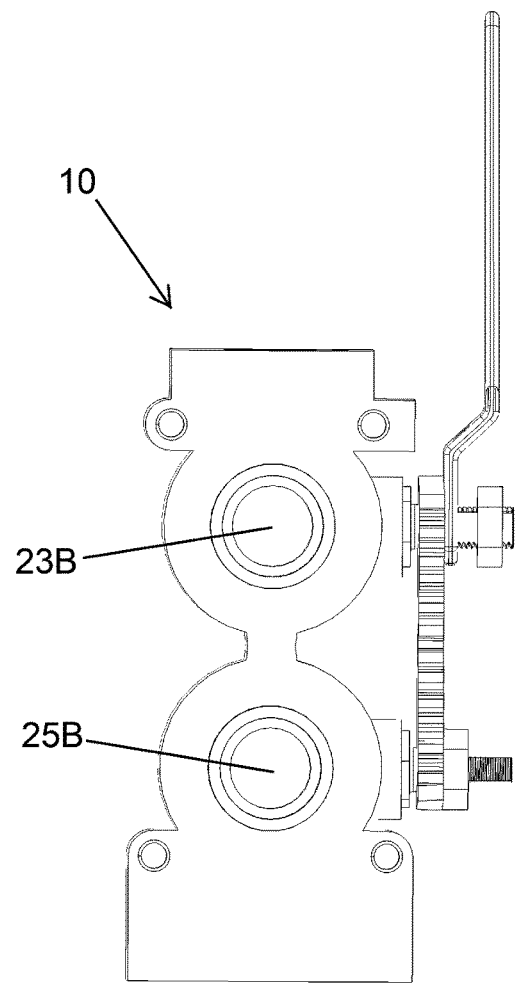

In some embodiments of the present invention, a switching assembly may include one or more ports through which fluid may flow. As illustrated in FIGS. 6 and 7, switching assembly 10 may comprise a first set of ports 23A and 25A on a first side of assembly housing 20. Similarly, switching assembly 10 may comprise a second set of ports 23B and 25B on a second side of assembly housing 20. When fluid enters switching assembly 10 through main inlet 21, the fluid may be diverted out of first chamber 22 through either port 23A or 23B, depending on the configuration of three-way valve 42. In preferred embodiments, and as further described below (and with reference to FIGS. 10-13), after exiting port 23A or 23B, the fluid may enter into a pressure relief valve. Fluid may be diverted back into switching assembly 10 through either port 25A or 25B, depending on the configuration of three-way valve 43. It is to be appreciated, however, that reference to diversion "in" or "out" in the figures are relative terms, and does not limit the scope of the invention.

Figure 8:
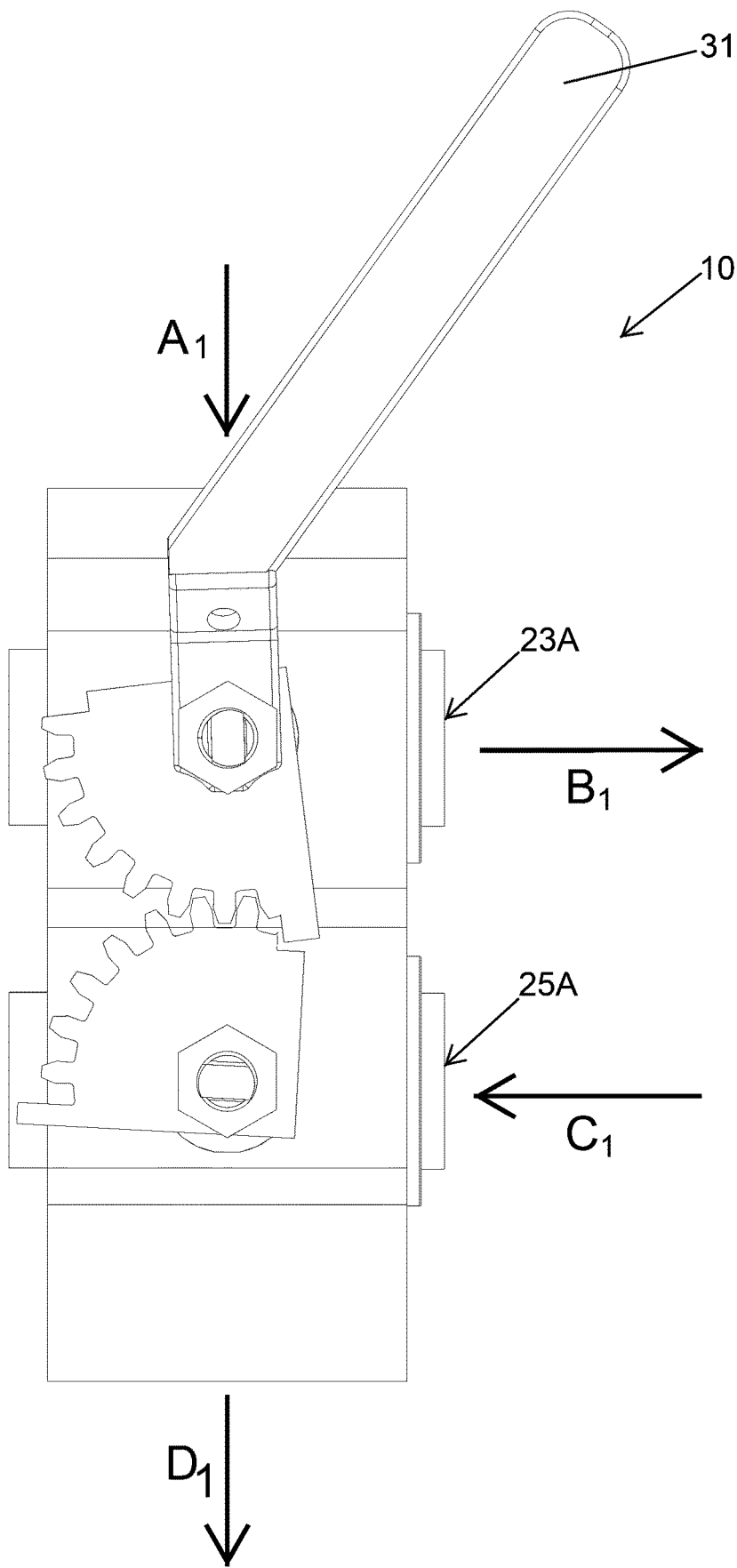
FIG. 8 is a diagram illustrating an exemplary direction of fluid flow through the switching assembly illustrated in FIG. 1, where the actuator is in a first position, in accordance with some embodiments of the present invention.
Figure 9:
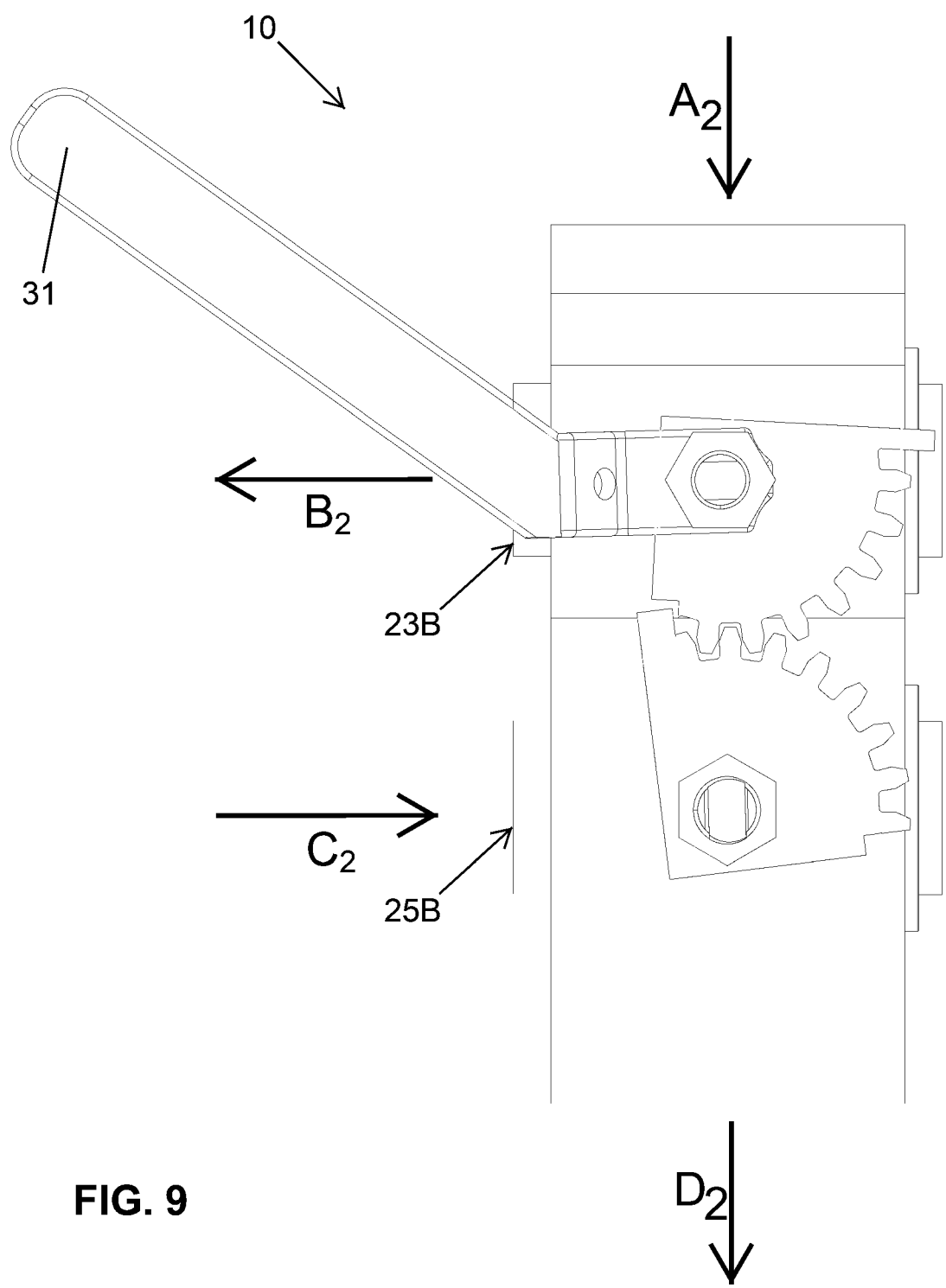
FIG. 9 is a diagram illustrating an exemplary direction of fluid flow through the switching assembly illustrated in FIG. 1, where the actuator is in a second position, in accordance with some embodiments of the present invention.

Exemplary fluid flow paths are illustrated in FIGS. 8 and 9, and with reference to these examples, it is to be appreciated that "in," "out," "enter," "exit," "clockwise," and "counterclockwise" are relative terms which do not limit the scope of the invention. In one implementation of the present invention, fluid flow through switching assembly 10 may be diverted according to the diagram of FIG. 8. In this configuration, lever 31 is fully turned in a clockwise direction to orient each three-way valve (not visible) in a first position. In this first position, fluid may enter through the main inlet of switching assembly 10 in the direction indicated by $A_1$. The fluid may then be diverted within the first chamber causing the fluid to flow out of switching assembly 10 through port 23A in the direction indicated by $B_1$. Fluid returning to switching assembly 10 (e.g., through a direct or branched return pipe, or a housing), may reenter through port 25A of the second chamber in the direction indicated by $C_1$. The fluid may then be diverted back out of switching assembly 10 through the main outlet thereof in the direction indicated by $D_1$.

In another implementation of the present invention, and in accordance with the exemplary diagram of FIG. 9, to change the direction of fluid flow through switching assembly 10, the lever 31 can be fully turned in a counterclockwise direction, causing each three-way valve to rotate approximately 90 degrees. In this second position, fluid may enter through the main inlet of switching assembly 10 in the direction indicated by $A_2$. The fluid may then be diverted within the first chamber causing the fluid to flow out of switching assembly 10 through port 23B in the direction indicated by $B_2$. Fluid returning to switching assembly 10 may reenter through port 25B of the second chamber in the direction indicated by $C_2$. The fluid may then be diverted back out of switching assembly 10 through the main outlet thereof in the direction indicated by $D_2$.

It is to be appreciated that, according to some embodiments of the present invention, a switching assembly may be configured to be a self-contained, balanced system—that is, all fluid entering through the inlet of the assembly may be balanced by fluid exiting through the outlet of the assembly, without any fluid communication with the atmosphere (e.g., venting thereto). In particular, and with reference to FIGS. 8 and 9, a fluid entering switching assembly 10 in the direction $A_1$ or $A_2$ may only be diverted according to a fluid path in the directions of $B_1$ and $C_1$ and/or $B_2$ and $C_2$. Additionally, and as a consequence of balanced fluid flow between the inlet and the outlet, fluid flow through any part of the assembly may always be balanced by fluid flow through another part of the assembly, according to the defined fluid paths. For example, and with further reference to FIGS. 8 and 9, if fluid flow through switching assembly 10 is isolated such that fluid can only enter through main inlet 21 (not illustrated) and exit through main outlet 29 (not illustrated), then fluid flowing in the direction indicated by $B_1$ and/or $B_2$ must be balanced by fluid flowing in the direction indicated by $C_1$ and/or $C_2$, respectively, since there are no other pathways for the fluid to flow through (in some implementations, fluid may simultaneously flow in both directions indicated by $B_1$ and $B_2$, as well as in both directions indicated by $C_1$ and $C_2$ if, for example, lever 31 is between the positions illustrated in FIGS. 8 and 9). Similarly, if there is no fluid flowing in the directions indicated by $B_1$ and $B_2$, then there must be no fluid flowing in the directions indicated by $C_1$ and $C_2$, respectively. More particularly, the volume of fluid flowing out of switching assembly 10 through port 23A must be the same as the volume of fluid flowing into switching assembly 10 through port 25A. Similarly, the volume of fluid flowing out of switching assembly 10 through port 23B must be the same as the volume of fluid flowing into switching assembly 10 through port 25B. This also means that fluid flow through first chamber 22 must be balanced by fluid flow through second chamber 24 (assuming, as in this case, there is no loss of fluid to the atmosphere).

According to some embodiments of the present invention, a lever (or the like) of a switching assembly may be adapted to indicate the direction of fluid flow through the switching assembly. For example, as further illustrated in FIGS. 8 and 9, when fluid is flowing in the directions indicate by $B_1$ and $C_1$, a distal end of lever 31 may point toward the side of switching assembly 10 through which fluid is exiting (through port 23A) and entering (through port 25A) (in this case, the right side of FIG. 8). Likewise, when fluid is flowing in the directions indicate by $B_2$ and $C_2$, the distal end of lever 31 may point toward the side of switching assembly 10 through which fluid is exiting (through port 23B) and entering (through port 25B) (in this case, the left side of FIG. 8). It is further to be appreciated that as lever 31 is rotated throughout its positions between those illustrated in FIGS. 8 and 9 (indicating a change in the fluid flow path), fluid flow through switching assembly 10 remains balanced and the fluid maintains flow through the only the illustrated pathways.

In some embodiments of the present invention, a switching assembly can be coupled with one or more pressure relief valves. A pressure relief valve may include a housing and a cartridge which allows fluid to pass through the relief valve housing only when a set level of pressure is exceeded. Although reference to the invention as exemplified in the Figures is made with respect to a certain style of pressure relief valve, it is to be appreciated that embodiments pertain to other styles of pressure relief valves, including but not limited to rising/non-rising stem valves, gate valves, quick release valves, butterfly valves, and globe valves.

Figure 10:
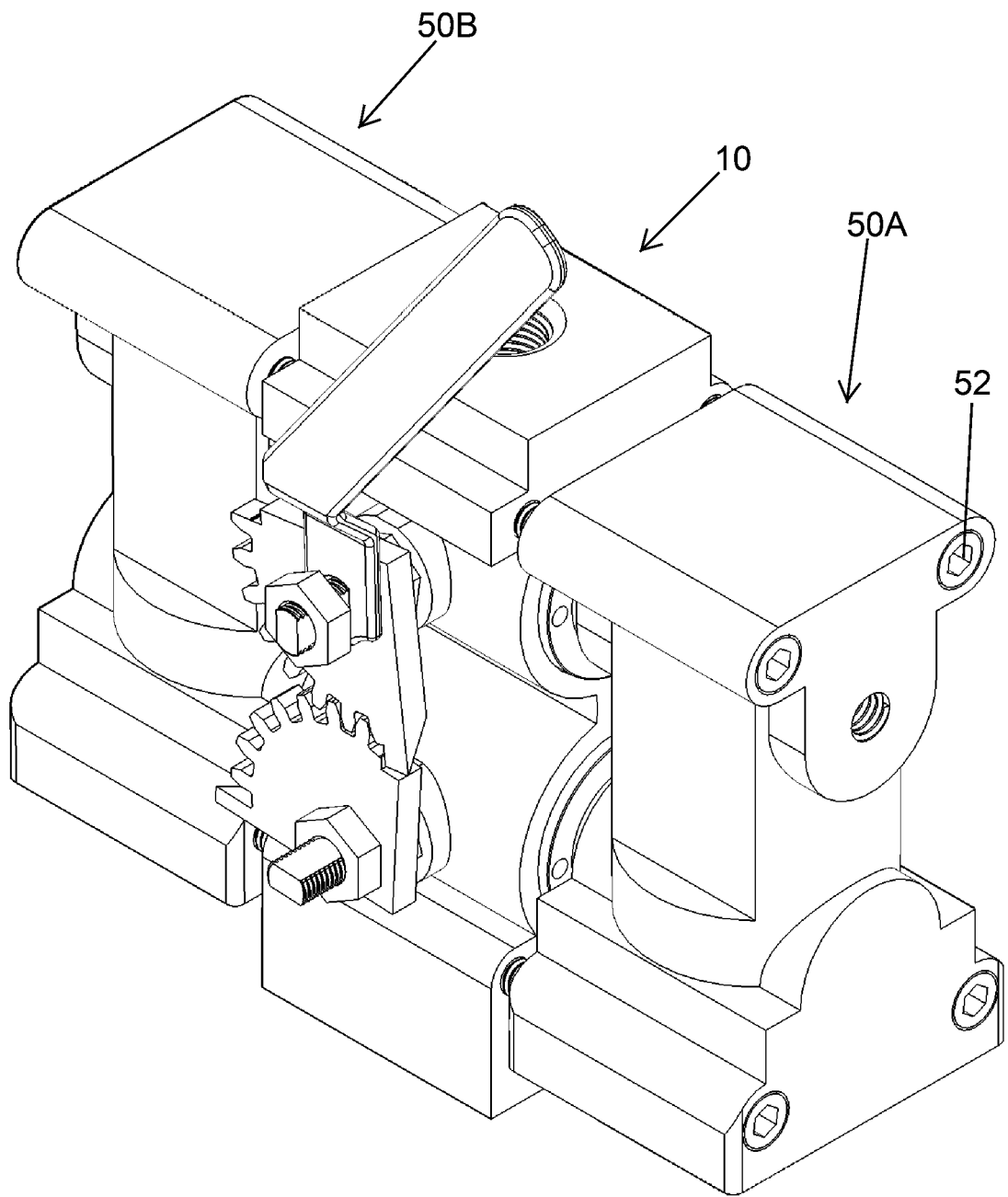
FIG. 10 is a perspective view of the switching assembly illustrated in FIG. 1 coupled with an exemplary first pressure relief valve and an exemplary second pressure relief valve, in accordance with some embodiments of the present invention.
Figure 11:
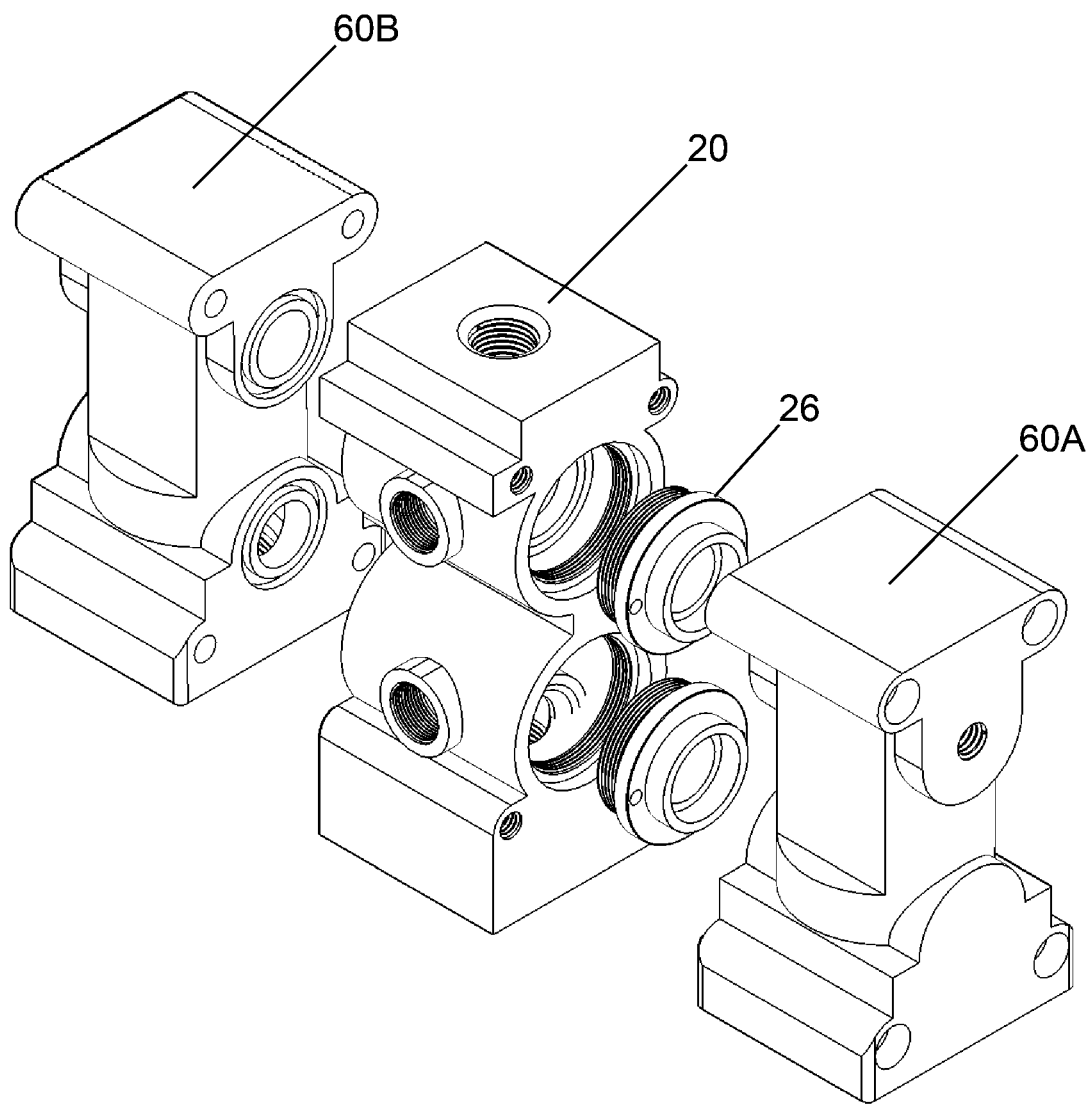
FIG. 11 is an exploded view of the switching assembly and pressure relief valves illustrated in FIG. 10.

Referring to FIGS. 10 and 11, switching assembly 10 may be coupled with a first pressure relief valve 50A and a second pressure relief valve 50B. First pressure relief valve 50A may comprise a relief valve housing 60A which may be secured to a first side of assembly housing 20 of switching assembly 10 by one or more fasteners 52. Similarly, second pressure relief valve 50B may comprise a relief valve housing 60B which may be secured to a second side of assembly housing 20 of switching assembly 10 by one or more fasteners 52.

In some embodiments, a pressure relief valve may have one or more ports through which fluid may flow between the pressure relief valve and a switching assembly. For example, pressure relief valve housings 60A and 60B may each comprise a set of ports which may be complementary to the ports of switching assembly 10, through which fluid may enter or exit each pressure relief valve housing. Pressure relief valve housing 60A may comprise ports which may be aligned with ports 23A and 25A of assembly housing 20, respectively, when switching assembly 10 is engaged with first pressure relief valve 50A. Similarly, pressure relief valve housing 60B may comprise ports which may be aligned with ports 23B and 25B of assembly housing 20, respectively, when switching assembly 10 is engaged with second pressure relief valve 50B.

When first pressure relief valve 50A and second pressure relief valve 50B are engaged with switching assembly 10, fluid may flow out of first chamber 22 and into one of relief valve housings 60A or 60B through one of the ports thereof, depending on the status of a first three-way valve (for example, and without limitation, three-way valve 42 as illustrated in FIG. 2). The fluid may then pass through either pressure relief valve housing 60A or 60B and, upon a pressure event, exit through a different port of pressure relief valve housing 60A or 60B to reenter switching assembly 10 into second chamber 24. For example, when lever 31 of switching assembly 10 is fully turned in the clockwise direction (as shown in FIG. 10), fluid entering switching assembly 10 through the top side thereof is diverted to first pressure relief valve 50A. In this case, the direction of fluid flow is analogous to the direction indicated in FIG. 8: fluid flows out of the first chamber of switching assembly 10 and into the top portion of first pressure relief valve 50A; the fluid then flows through first pressure relief valve 50A and exits from the bottom portion thereof, thereby returning to switching assembly 10 within the second chamber thereof; the fluid is then diverted out of switching assembly 10 through the bottom side thereof. To divert the flow through second pressure relief valve 50B, a user may turn lever 31 in a counterclockwise direction to simultaneously rotate each three-way valve.

In an exemplary implementation of the present invention, a switching assembly may allow a user to easily replace a pressure relief valve cartridge without having to divert or shut off fluid flow upstream. For example, if a pressure event occurred in a pressurized system comprising a switching assembly coupled with a pair of pressure relief valves, a user (or operator) could safely remove the activated pressure relief valve cartridge from the corresponding (active) pressure relief valve. To remove the activated pressure relief valve cartridge, the user may fully turn the actuator lever of the switching assembly so that fluid flow is redirected to the other pressure relief valve containing the unactivated pressure relief cartridge. Once the fluid is diverted, the user can remove the activated pressure relief valve cartridge from the corresponding pressure relief valve housing and replace it. The user may then, optionally, return the actuator lever to its original position so that fluid flow returns to the pressure relief valve with the newly replaced pressure relief cartridge.

It is to be appreciated that embodiments of the present invention are not limited to "cartridge" style pressure relief valves. For example, and without limitation, some embodiments of the present invention pertain to single use pressure relief valves. In such examples, there is no cartridge to remove, and the switching assembly of the present invention enables a user to disengage or remove the entire pressure relief valve (including the housing) from the switching assembly housing. In accordance with some embodiments of the present invention, a switching assembly may also be adapted to be used with a variety of types of pressure relief valve cartridges and housings. In order to accommodate other types of pressure relief valves, an adapter or mount may be used to secure a pressure relief valve housing to a switching assembly housing. For example, as further illustrated in FIG. 11, a system may include one or more adapters 26 configured to be engaged with the ports of switching assembly housing 20 to help secure different styles of pressure relief valve housings 50A and/or 50B to switching assembly housing 20. It is to be appreciated that an adapter (or connector, converter, coupler, or other like terms) may be constructed according to the design and configuration of the switching assembly housing and/or the pressure relief valve housing, such that variations in design and function thereof can be accommodated for.

Figure 12:
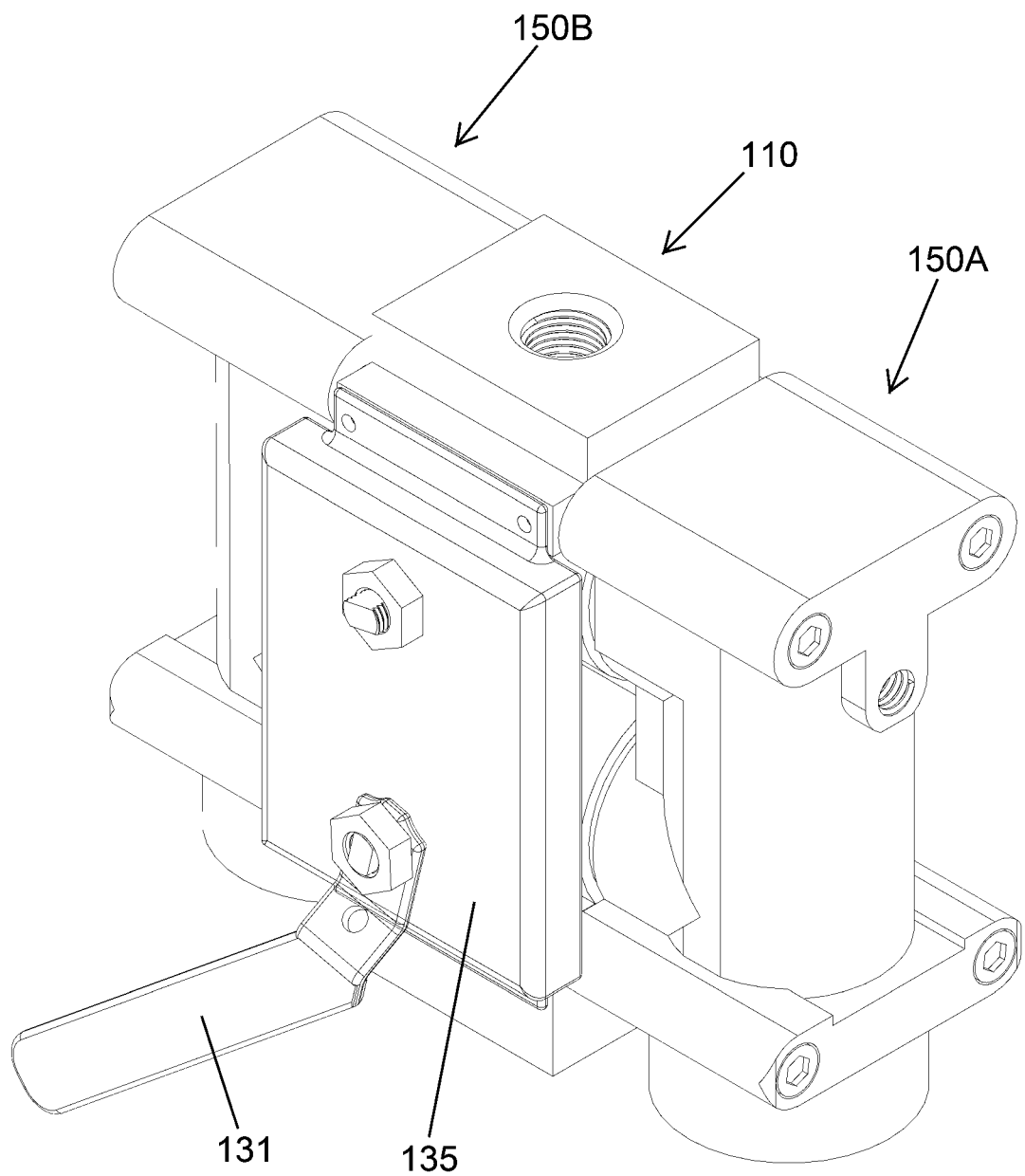
FIG. 12 is a perspective view illustrating an exemplary switching assembly coupled with an exemplary first pressure relief valve and an exemplary second pressure relief valve, in accordance with some embodiments of the present invention.

For example, as illustrated in FIG. 12, switching assembly 110 may be coupled with a pair of pressure relief valves 150A and 150B. Relative to pressure relief valves 50A and 50B, pressure relief valves 150A and 150B may be used to accommodate other types of pressure relief valve cartridges. Similar to the above described examples, switching assembly 110 may comprise a first (upper) three-way valve and a second (lower) three-way valve (not visible). Switching assembly 110 may also include a plate 135 partially enclosing, or covering, the actuator for the three-way valves. Similar to exemplary actuators previously described, lever 131, may be coupled with one or more gears or stems of three-way valves.

According to some embodiments of the present invention, a switching assembly may further include a locking mechanism to prevent actuating of the three-way valves. For example, and with further reference to FIG. 12, a crossbar (not illustrated), having a pair of apertures at each lateral end and which may be adapted to receive a shackle (or cable) of a lock, may be fastened, or otherwise engaged, to plate 135 and disposed such that when lever 131 is fully turned in either a clockwise or counterclockwise direction, the distal end thereof may be aligned with one of the apertures of the crossbar (depending on which direction lever 131 is turned). To lock lever 131 in place, a portion of a shackle of a lock may be positioned through an aperture (not illustrated) in lever 131 and through one of the apertures of the crossbar, and then the lock may be engaged.

Further to the above, it is to be appreciated that, as previously described with reference to other exemplary embodiments, lever 131 may also provide an indication of the fluid flow path through switching assembly 110 and, therefore, through pressure relief valves 150A and 150B (or, more generally, any housings engaged to the switching assembly). For example, when lever 131 is fully turned in a clockwise direction (as illustrated in FIG. 12), the distal end of lever 131 may be generally oriented in a direction that is toward pressure relief valve 150B, indicating that fluid is being diverted thereto. Similarly, when lever 131 is fully turned in a counterclockwise direction (not illustrated), the distal end of lever 131 may be generally oriented in a direction that is toward pressure relief valve 150A, indicating that fluid is being diverted thereto.

Figure 13:
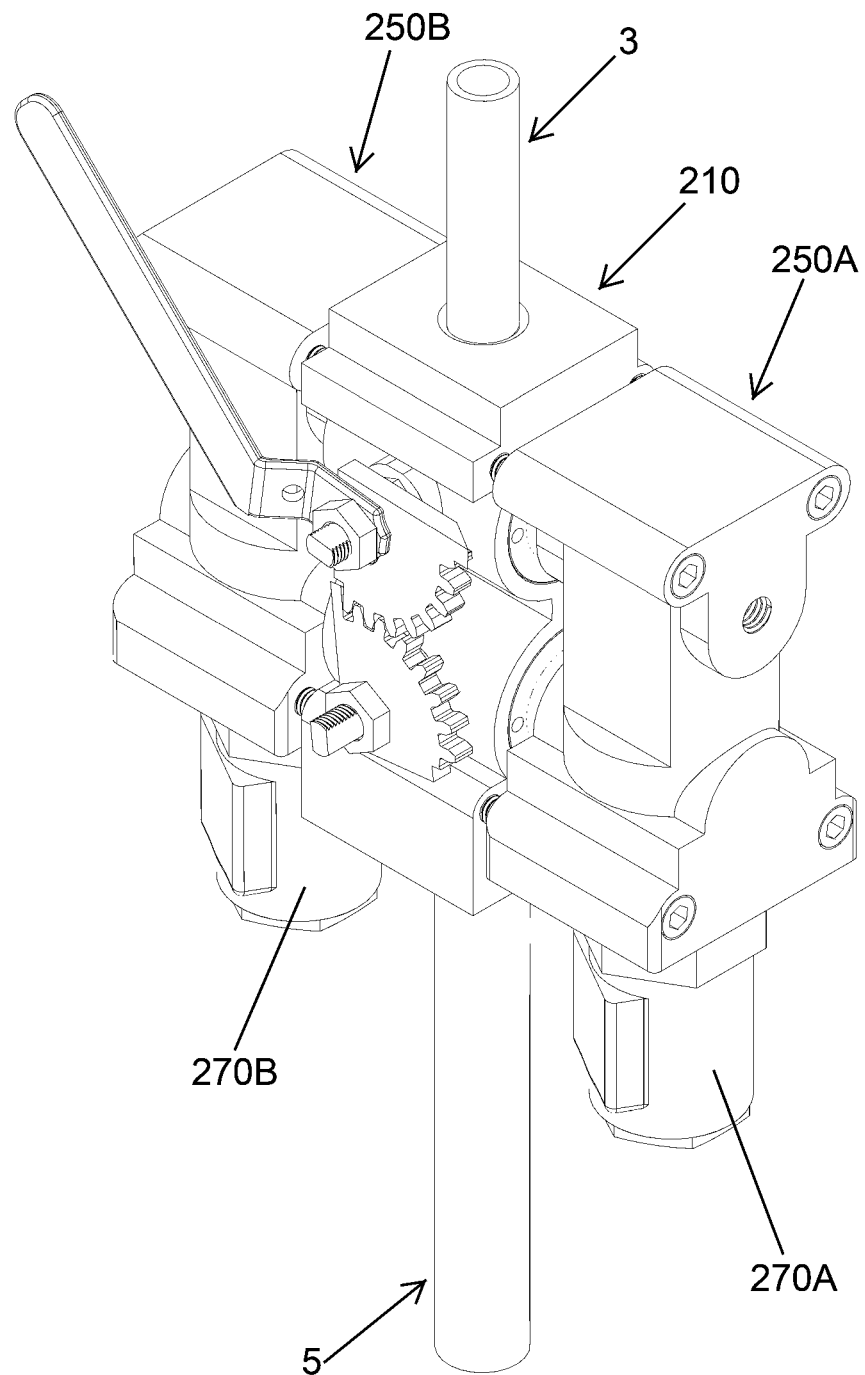
FIG. 13 is a perspective view illustrating an exemplary switching assembly coupled with a pressurized fluid line, a relief fluid line, an exemplary first pressure relief valve with a pressure relief valve inserted, and an exemplary second pressure relief valve with a pressure relief valve inserted, in accordance with some embodiments of the present invention.

As illustrated in FIG. 13, pressurized fluid line 3 and relief line 5 may be engaged with switching assembly 210. Switching assembly 210 may be coupled with pressurized fluid line 3 and relief line 5 via an inlet on the top side of switching assembly 210 and an outlet on the bottom side of switching assembly 210, respectively. First pressure relief valve 250A and a second pressure relief valve 250B may be engaged with switching assembly 210. Inserted into first pressure relief valve 250A may be pressure relief valve cartridge 270A, and inserted into second pressure relief valve 250B may be pressure relief valve cartridge 270B. If a pressure event were to occur within pressurized fluid line 3, second pressure relief valve 270B may be activated (pressure relief valve 250B would be activated since the actuator lever is in a fully counterclockwise turned position), releasing fluid through the outlet of switching assembly 210 and into relief line 5. To replace pressure relief valve cartridge 270B, a user (or operator) may fully turn the actuator lever in a clockwise direction, thereby diverting fluid flow to first pressure relief valve 250A.

In use, a user may insert pressure relief cartridge 270A into pressure relief valve housing 250A, insert pressure relief cartridge 270B into second pressure relief valve housing 250B, and place the actuator in a first position (for example, by rotating the lever in a counterclockwise direction). When the actuator is in the first position the system has a fluid path towards pressure relief valve housing 250B. It is therefore possible to thereafter safely remove pressure relief cartridge 270A from pressure relief valve housing 250A and insert a new pressure relief cartridge into pressure relief valve housing 250A. After placing the actuator in a second position (for example, by rotating the lever in a clockwise direction), the system has a fluid path towards pressure relief valve housing 250A. It is therefore possible to thereafter safely remove pressure relief cartridge 270B from pressure relief valve housing 250B and insert a new pressure relief cartridge into pressure relief valve housing 250B.

It is to be understood that variations, modifications, and permutations of embodiments of the present invention may be made without departing from the scope thereof. It is also to be understood that the present invention is not limited by the specific embodiments, descriptions, or illustrations or combinations of either components or steps disclosed herein. Thus, although reference has been made to the accompanying figures, it is to be appreciated that these figures are exemplary and are not meant to limit the scope of the invention. For example, the above exemplary embodiments describe the use of an actuator with two gears, which allows each three-way valve to rotate in opposite directions when one gear is turned. It is to be appreciated, however, that an actuator may comprise a third gear centrally positioned between, and coupled with, each of the gears which are coupled with each three-way valve. In this configuration, rotation of one gear causes each three-way valve to rotate in the same direction.

Furthermore, it is to be appreciated that a switching assembly, in accordance with some embodiments of the present invention, may be used, or adapted to be used, with a variety of types of valves and housings. Any such use or adaptation of the present invention may be made without departing from the scope thereof.

Moreover, it is to be understood that the present invention may not be limited to use on a single line of fluid. For example, and without limitation, separate lines (i.e., lines emanating from different sources) may be connected to a switching assembly, such that fluid may enter the switching assembly at both the main inlet and main outlet. In this case, separate lines of fluid can be diverted, simultaneously, by means of the switching assembly actuator. In this example, if a switching assembly were configured as shown in FIGS. 8 and 9, the direction of fluid flow through one chamber would mirror the direction of fluid flow in the other.

What is claimed is:

1. A switching assembly for diverting a fluid flowing into said switching assembly, comprising:
   a) an assembly housing comprising an inlet, an outlet, a first chamber, and a second chamber;
   b) a first three-way valve comprising a first stem and a first valve member, wherein said first valve member is positioned within said first chamber of said assembly housing;
   c) a second three-way valve comprising a second stem and a second valve member, wherein said valve member is positioned within said second chamber of said assembly housing; and
   d) an actuator adapted to rotate said first three-way valve and said second three-way valve in opposite directions, said actuator comprising a first gear engaged with said first stem and a second gear engaged with said second stem;
   wherein said first gear is directly meshed with said second gear,
   wherein a central axis of each of said first stem and said second stem are perpendicular to a central axis extending from said inlet to said outlet,
   wherein an inlet fluid flow is defined through said inlet, wherein an outlet fluid flow is defined through said outlet, and
   wherein in all rotational positions of said actuator, said inlet fluid flow equals said outlet flow.

2. The switching assembly of claim 1, wherein said actuator further comprises a lever engaged with said first stem.

3. The switching assembly of claim 1, wherein said first stem and said second stem are substantially parallel.

4. The switching assembly of claim 1, wherein said first three-way valve comprises a first ball valve and said first valve member comprises a first ball, and wherein said second three way valve comprises a second ball valve and said second valve member comprises a second ball.

5. The switching assembly of claim 2, wherein said lever is configured to indicate a fluid path through said switching assembly.

6. The switching assembly of claim 1, wherein said first three-way valve and said second three-way valve are each configured to divert said fluid from said inlet to said outlet according to one of the group consisting of a first fluid path, a second fluid path, and combinations thereof.

7. The switching assembly of claim 6, wherein neither of said first fluid path or said second fluid path are in fluid communication with the atmosphere.

8. The switching assembly of claim 6, wherein said assembly housing further comprises a first set of ports and a second set of ports,
   wherein said first fluid path is through a first port and a second port of said first set of ports, and
   wherein said second fluid path is through a first port and a second port of said second set of ports.

9. The switching assembly of claim 8, wherein in all rotational positions of said actuator, along said first fluid path a volume of fluid through said first port of said first set of ports is equal to a volume of fluid through said outlet, and along said second fluid path a volume of fluid through said first port of said second set of ports is equal to a volume of fluid through said outlet.

10. A system for diverting a fluid flowing in a pressurized line to a relief line comprising:
    a) a switching assembly comprising:
       i) an assembly housing having an inlet coupled with said pressurized line, an outlet coupled with said relief line, a first set of ports, and a second set of ports,
       ii) a first three-way valve comprising a first stem,
       iii) a second three-way valve comprising a second stem, and
       iv) an actuator adapted to rotate said first three-way valve and said second three-way valve in opposite directions, said actuator comprising a first gear engaged with said first stem and a second gear engaged with said second stem, wherein said first gear is directly meshed with said second gear;
    wherein an inlet fluid flow is defined through said inlet, wherein an outlet fluid flow is defined through said outlet, and
    wherein in all rotational positions of said actuator, a fluid flow through said inlet equals a fluid flow through said outlet;
    b) a first housing having a set of ports and engaged with said assembly housing, wherein said set of ports of said first housing are aligned with said first set of ports of said assembly housing;
    c) a first adapter engaged with each of a first port of said first set of ports of said assembly housing and a first port of said set of ports of said first housing; and d) a second adapter engaged with each of a second port of said first set of ports of said assembly housing and a second port of said set of ports of said first housing.

11. The system of claim 10, further comprising:
e) a second housing having a set of ports and engaged with said assembly housing, wherein said set of ports of said second housing are aligned with said second set of ports of said assembly housing.

12. The system of claim 11, further comprising:
f) a third adapter engaged with each of a first port of said second set of ports of said assembly housing and a first port of said set of ports of said second housing; and
g) a fourth adapter engaged with each of a second port of said second set of ports of said assembly housing and a second port of said set of ports of said second housing.

13. The system of claim 11, further comprising:
f) a lock having a shackle; and
g) a crossbar engaged with said assembly housing, wherein said crossbar comprises a first aperture at a first lateral end and a second aperture at a second lateral end and wherein each aperture is adapted to receive said shackle of said lock;
wherein said actuator of said switching assembly further comprises a lever having an aperture adapted to receive said shackle of said lock.

14. The system of claim 13, wherein said shackle of said lock is received through each of said aperture of said lever and said first aperture of said crossbar.

15. The system of claim 13, wherein said shackle of said lock is received through each of said aperture of said lever and said second aperture of said crossbar.

16. The system of claim 14, wherein a distal end of said lever is substantially oriented in a direction toward said first housing and wherein said fluid is flowing through said first housing.

17. The system of claim 15, wherein a distal end of said lever is substantially oriented in a direction toward said second housing and wherein said fluid is flowing through said second housing.

* * * * *